(12) United States Patent
Okuda

(10) Patent No.: US 6,449,361 B1
(45) Date of Patent: *Sep. 10, 2002

(54) CONTROL METHOD AND DEVICE FOR ECHO CANCELLER

(75) Inventor: Kozo Okuda, Hirakata (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/265,378

(22) Filed: Mar. 10, 1999

(30) Foreign Application Priority Data

Mar. 31, 1998 (JP) .......................................... 10-105695

(51) Int. Cl.[7] .............................................. H04M 9/08
(52) U.S. Cl. ........................... 379/406.01; 379/406.03; 379/406.04; 379/406.05; 379/406.08; 379/406.06; 379/406.02
(58) Field of Search .................................. 379/400–406

(56) References Cited

U.S. PATENT DOCUMENTS

| | | | | |
|---|---|---|---|---|
| 5,598,468 A | * | 1/1997 | Ammichi et al. | ............ 379/410 |
| 5,600,714 A | * | 2/1997 | Eppler et al. | |
| 5,661,795 A | * | 8/1997 | Maeda | ........................ 379/412 |
| 5,943,407 A | * | 8/1999 | Davis et al. | |
| 6,061,444 A | * | 5/2000 | Kawahara et al. | .......... 379/410 |
| 6,148,078 A | * | 11/2000 | Romesburg | .................. 379/410 |
| 6,205,124 B1 | * | 3/2001 | Hamdi | |

* cited by examiner

Primary Examiner—Forester W. Isen
Assistant Examiner—Ramnandan Singh
(74) Attorney, Agent, or Firm—Smith, Gambrell & Russell, LLP

(57) ABSTRACT

A method of controlling an echo canceller for providing an echo cancellation signal by subtracting an echo replica signal either from a transmit signal or a receive signal. The method includes the steps of a first step of performing a speech detection based on the echo cancellation signal provided by the echo canceller; a second step of detecting a double talk condition based on a result of the speech detection performed by the first step; and a third step of controlling a learning operation of the echo canceller based on a result of the double talk detection performed by the second step.

4 Claims, 13 Drawing Sheets

CONTROL METHOD AND DEVICE FOR ECHO CANCELLER

BACKGROUND OF THE INVENTION

1. Field of the Invention

The present invention relates generally to a control method and device for echo canceller and more particularly, to an echo canceller control method and an echo canceller control device for use in hands-free telephones, live videoconference systems and the like.

2. Prior Art

In echo cancellers applied to hands-free telephones and employing adaptive filters, an adaptation operation of the adaptive filter is normally performed under a single talk condition. However, when a double talk condition (two-way simultaneous conversations) occurs, the adaptation operation is performed in a manner such as to remove not only an echo signal but also a talker's speech, resulting in confused estimate of an echo path impulse response. Hence, a learning operation must be suspended in the presence of the double talk condition.

In past, a variety of techniques have been proposed for detecting the double talk condition by using the input/output signal level, correlation function and the like. FIG. 13 shows a prior-art echo canceller 2 including a double talk detecting circuit 1 (see FIG. 2 of Japanese Unexamined Patent Publication No. 5(1993)-102887).

In the double talk detecting circuit 1, a level of a digital receive path signal RS is detected by an absolute value detecting circuit 3 and a differential circuit 5 while a level of a digital transmit path signal TS is detected by an absolute value detecting circuit 4 and a differential circuit 6.

Next, a comparator 7 performs an arithmetic operation of R=log{(a level of receive path signal RS)/(a level of transmit path signal TS)} for determination of a ratio R of the detected signal levels, which ratio is compared with a predetermined threshold value.

When the level ratio R becomes smaller than the threshold value, the double talk condition is determined to be present. In a period during which the double talk condition is determined to be present, the adaptation operation of an adaptive filter (ADF) 8 is suspended. This prevents the echo canceller 2 from making a false estimate of an impulse response of an echo path EP under the double talk condition, thus ensuring reliable echo cancellation operations.

In such an echo canceller 2, however, when the transmit path signal level becomes lower in conjunction with the movement of a near end talker, the level ratio R of the transmit path signal versus the receive path signal exceeds the threshold value. This may lead to a false determination of the single talk condition despite the actual presence of the double talk condition.

Thus, the prior-art double talk detecting circuit 1 is adversely affected by variations of the signal level due to the movement of the near end talker, a line failure and the like, suffering degraded accuracies of the double talk detection. Hence, unreliable echo cancellation operations result.

SUMMARY OF THE INVENTION

In view of the foregoing, it is an object of the invention to provide a control method and device for controlling the echo canceller which ensure the reliable echo cancellation operations.

In accordance with the invention, a first method of controlling the echo canceller for providing an echo cancellation signal by subtracting an echo replica signal either from a transmit signal or a receive signal, which method comprises the steps of: a first step of performing a speech detection based on the echo cancellation signal provided by the echo canceller; a second step of detecting a double talk condition based on a result of the speech detection performed by the first step; and a third step of controlling a learning operation of the echo canceller based on a result of the double talk detection performed by the second step.

In the first step, the speech detection is achieved by, for example, comparing a level of the echo cancellation signal provided by the echo canceller with a threshold value adaptively determined according to a level of background noise.

In the second step, the double talk condition is determined to be present when, for example, the echo cancellation signal provided by the echo canceller is determined to include speech and continues to indicate the presence of the speech for more than a predetermined period of time.

In the third step, the learning operation of the echo canceller is suspended while the double talk condition is detected by the second step.

In accordance with the invention, a second method of controlling an echo canceller for providing an echo cancellation signal by subtracting an echo replica signal either from a transmit signal or a receive signal, which method comprises the steps of: a first step of determining whether a learning operation of the echo canceller is permitted or not based on either of the transmit signal and the receive signal that is not removed of echo by the echo canceller; a second step of performing a speech detection based on the echo cancellation signal provided by the echo canceller; a third step of detecting a double talk condition based on a result of the speech detection performed by the second step; and a fourth step of controlling the learning operation of the echo canceller based on a determination made by the first step and a result of the double talk detection performed by the third step.

In the second step, the speech detection is achieved by, for example, comparing a level of the echo cancellation signal provided by the echo canceller with a threshold value adaptively determined according to a level of background noise.

In the third step, the double talk condition is determined to be present when, for example, the echo cancellation signal provided by the echo canceller is determined to include speech and continues to indicate the presence of the speech for more than a predetermined period of time.

In the fourth step, the learning operation of the echo canceller is suspended while the first step determines the learning operation of the echo canceller to be inhibited or while the double talk condition is detected by the third step.

In accordance with the invention, a third method of controlling an echo canceller for providing an echo cancellation signal by subtracting an echo replica signal either from a transmit signal or a receive signal, which method comprises the steps of: a first step of performing a speech detection based on the echo cancellation signal provided by the echo canceller; a second step of performing a speech detection based on either of the transmit signal and the receive signal that is not removed of echo by the echo canceller; a third step of performing a double talk detection based on a result of the speech detection performed by the first step and a result of the speech detection performed by the second step; and a fourth step of controlling a learning operation of the echo canceller based on a result of the double talk detection performed by the third step.

In the first step, the speech detection is achieved by, for example, comparing a level of the echo cancellation signal provided by the echo canceller with a first threshold value adaptively determined according to a level of background noise.

In the second step, the speech detection is achieved by, for example, comparing a level of either of the transmit signal and the receive signal that is not removed of the echo by the echo canceller with a second threshold value adaptively determined according to a level of background noise.

In the third step, the double talk condition is determined to be present when, for example, both the echo cancellation signal provided by the echo canceller and either of the transmit signal and the receive signal that is not removed of the echo by the echo canceller are determined to include speeches and continue to indicate the presence of the speeches for more than a predetermined period of time.

In the fourth step, the learning operation of the echo canceller is suspended while the double talk condition is detected by the third step.

In accordance with the invention, a fourth method of controlling an echo canceller for providing an echo cancellation signal by subtracting an echo replica signal either from a transmit signal or a receive signal, which method comprises the steps of: a first step of determining whether a learning operation of the echo canceller is permitted or not based on either of the transmit signal and the receive signal that is not removed of echo by the echo canceller; a second step of performing a speech detection based on the echo cancellation signal provided by the echo canceller; a third step of performing a speech detection based on either of the transmit signal and the receive signal that is not removed of the echo by the echo canceller; a fourth step of detecting a double talk condition based on a result of the speech detection performed by the second step and a result of the speech detection performed by the third step; and a fifth step of controlling the learning operation of the echo canceller based on a determination made by the first step and a result of the double talk detection performed by the fourth step.

In the second step, the speech detection is achieved by, for example, comparing a level of the echo cancellation signal provided by the echo canceller with a first threshold value adaptively determined according to a level of background noise.

In the third step, the speech detection is achieved by, for example, comparing a level of either of the transmit signal and the receive signal that is not removed of the echo by the echo canceller with a second threshold value adaptively determined according to a level of background noise.

In the fourth step, the double talk condition is determined to be present when, for example, both the echo cancellation signal provided by the echo canceller and either of the transmit signal and the receive signal that is not removed of the echo by the echo canceller are determined to include speeches and continue to indicate the presence of the speeches for more than a predetermined period of time.

In the fifth step, the learning operation of the echo canceller is suspended while the first step determines the learning operation of the echo canceller to be inhibited or while the double talk condition is detected by the fourth step.

In accordance with the invention, a fifth method of respectively controlling an acoustic echo canceller for providing a first echo cancellation signal by subtracting a first echo replica signal from a transmit signal and a hybrid echo canceller for providing a second echo cancellation signal by subtracting a second echo replica signal from a receive signal, which method comprises the steps of: a first step of determining whether a learning operation of the acoustic echo canceller is permitted or not based on a level of the second echo cancellation signal provided by the hybrid echo canceller; a second step of determining whether a learning operation of the hybrid echo canceller is permitted or not based on a level of the first echo cancellation signal provided by the acoustic echo canceller; a third step of performing a speech detection based on the level of the first echo cancellation signal; a fourth step of performing a speech detection based on the level of the second echo cancellation signal; a fifth step of detecting a double talk condition based on a result of the speech detection performed by the third step and a result of the speech detection performed by the fourth step; a sixth step of controlling the learning operation of the acoustic echo canceller based on a determination made by the first step and a result of the double talk detection performed by the fifth step; and a seventh step of controlling the learning operation of the hybrid echo canceller based on a determination made by the second step and the result of the double talk detection performed by the fifth step.

For example, the fifth step comprises a step of determining that a single talk condition is present if at least one of the results of the speech detections performed by the third step and the fourth step indicate the absence of speech; a step of calculating a duration of speeches if both the results of the speech detections performed by the third step and the fourth step indicate the presence of the speeches; a step of determining that an indeterminate condition is present if the duration of the speeches is less than a predetermined period of time; and a step of determining that the double talk condition is present if the duration of the speeches is not less than the predetermined period of time.

It is preferred that the fifth step further comprises a step of backing up an adaptive filter coefficient provided by the learning operation of the acoustic echo canceller and an adaptive filter coefficient provided by the learning operation of the hybrid echo canceller, respectively, when the single talk condition is present; and a step of performing echo cancellation operations by using the adaptive filter coefficients backed up by the acoustic echo canceller and the hybrid echo canceller, respectively, when the double talk condition or the indeterminate condition is present.

In accordance with the invention, a first control device for controlling an echo canceller for providing an echo cancellation signal by subtracting an echo replica signal either from a transmit signal or a receive signal, which control device comprises: judgment means for determining whether a learning operation of the echo canceller is permitted or not based on either of the transmit signal and the receive signal that is not removed of echo by the echo canceller; first speech detecting means for performing a speech detection based on the echo cancellation signal provided by the echo canceller; second speech detecting means for performing a speech detection based on either of the transmit signal and the receive signal that is not removed of the echo by the echo canceller; double talk detecting means for detecting a double talk condition based on a result of the speech detection performed by the first speech detecting means and a result of the speech detection performed by the second speech detecting means; and control means for controlling the learning operation of the echo canceller based on a determination made by the judgment means and a result of the double talk detection performed by the double talk detecting means.

In accordance with the invention, a second echo canceller control device for respectively controlling an acoustic echo canceller for providing a first echo cancellation signal by subtracting a first echo replica signal from a transmit signal and a hybrid echo canceller for providing a second echo cancellation signal by subtracting a second echo replica signal from a receive signal, which control device comprises: first judgment means for determining whether a learning operation of the acoustic echo canceller is permitted or not based on a level of the second echo cancellation signal provided by the hybrid echo canceller; second judgment means for determining whether a learning operation of the hybrid echo canceller is permitted or not based on a level of the first echo cancellation signal provided by the acoustic echo canceller; first speech detecting means for performing a speech detection based on the level of the first echo cancellation signal; second speech detecting means for performing a speech detection based on the level of the second echo cancellation signal; double talk detecting means for detecting a double talk condition based on a result of the speech detection performed by the first speech detecting means and a result of the speech detection performed by the second speech detecting means; first control means for controlling the learning operation of the acoustic echo canceller based on a determination made by the first judgment means and a result of the double talk detection performed by the double talk detecting means; and second control means for controlling the learning operation of the hybrid echo canceller based on a determination made by the second judgment means and the result of the double talk detection performed by the double talk detecting means.

According to the first echo canceller control method as defined by the invention, the speech detection is performed based on the echo cancellation signal provided by the echo canceller so that possibilities of false detection mistaking the echo for speech can be decreased. Inasmuch as the double talk condition is detected based on such a reliable result of the speech detection, the double talk condition is not falsely detected as the single talk condition. Therefore, the echo canceller is prevented from making a false estimate of the echo path.

In addition, the speech detection is achieved by comparing the level of the echo cancellation signal provided by the echo canceller with the threshold value adaptively determined according to the level of the background noise whereby the speech detection accuracies are prevented from being degraded by environmental changes.

Further, the presence of the double talk condition is determined when the echo cancellation signal provided by the echo canceller is determined to include speech and continue to indicate the presence of the speech for more than the predetermined period of time. This makes it possible to discriminate the double talk condition from an event caused by a degraded echo canceling performance due to the echo path changes. Hence, the accuracies of the double talk detection can be improved.

According to the second and fourth echo canceller control methods or to the first echo canceller control device as defined by the invention, whether the learning operation of the acoustic echo canceller interposed in the transmit path is permitted or not is determined based on the receive signal. On the other hand, whether the learning operation of the hybrid echo canceller interposed in the receive path is permitted or not is determined based on the transmit signal. When the level of the inputted signal is too low for the echo canceller to achieve learning, the learning operation of the echo canceller can be suspended irrespective of the presence of the double talk condition. This is effective to avoid the learning operation with a low degree of reliability.

According to the third and the fourth echo canceller control methods and the first echo canceller control device as defined by the invention, the acoustic echo canceller interposed in the transmit path also serves to detect speech in the receive signal. On the other hand, the hybrid echo canceller interposed in the receive path also serves to detect speech in the transmit signal. The result of such speech detection may also be utilized for enhancing the accuracy of the double talk detection, thus contributing to the improved reliability of the learning operation of the echo canceller.

According to the fifth echo canceller control method or the second echo canceller control device as defined by the invention, whether the learning operation of the acoustic echo canceller is permitted or not is determined based on the second echo cancellation signal provided by the hybrid echo canceller. On the other hand, whether the learning operation of the hybrid echo canceller is permitted or not is determined based on the first echo cancellation signal provided by the acoustic echo canceller.

This enables it to suspend the learning operations of the acoustic echo canceller and the hybrid echo canceller irrespective of the presence of the double talk condition when the levels of the transmit signal and the receive signal, which have been removed of echo, are too low for the acoustic and hybrid echo cancellers to achieve the learning. Hence, the learning operations with low degrees of reliability can be prevented.

Inasmuch as the speech detections are performed based on the levels of the first and second echo cancellation signals, respectively, the possibilities of false detection mistaking the echo for speech can be decreased. Thus, the double talk condition is detected based on the speech detections with high degrees of reliability so that the double talk condition is not falsely detected as the single talk condition. Hence, an increased accuracy of the double talk detection is accomplished. Consequently, the echo canceller is prevented from making the false estimate of the echo path, accomplishing an enhanced reliability of the learning operation.

DETAILED DESCRIPTION OF PREFERRED EMBODIMENTS

Now preferred embodiments of the invention will hereinbelow be described with reference to FIGS. 1 to 12.

[1] First Embodiment

Figure 1:
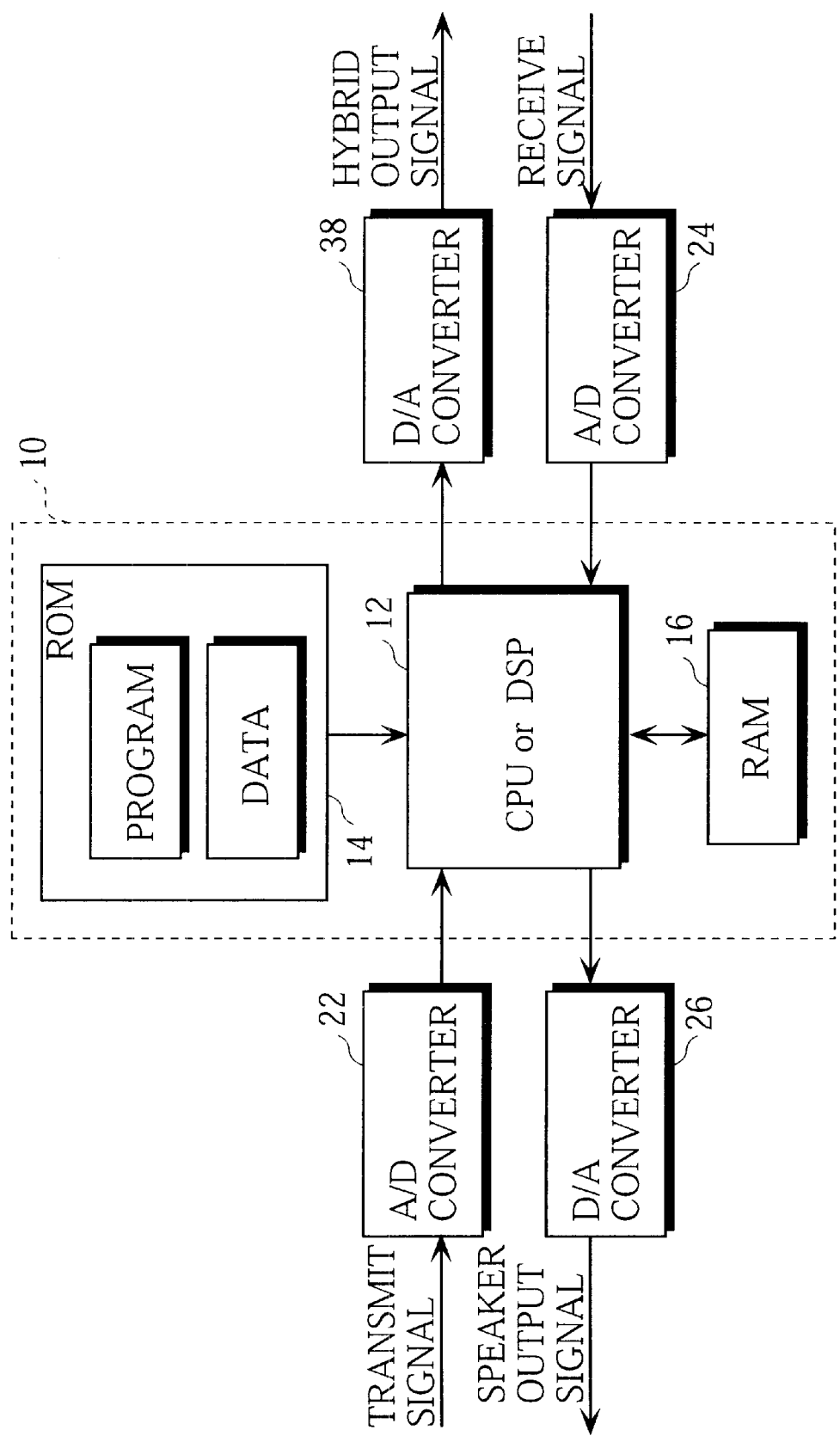
FIG. 1 is a block diagram showing an electrical configuration of an echo canceller according to an embodiment of the invention.
Figure 2:
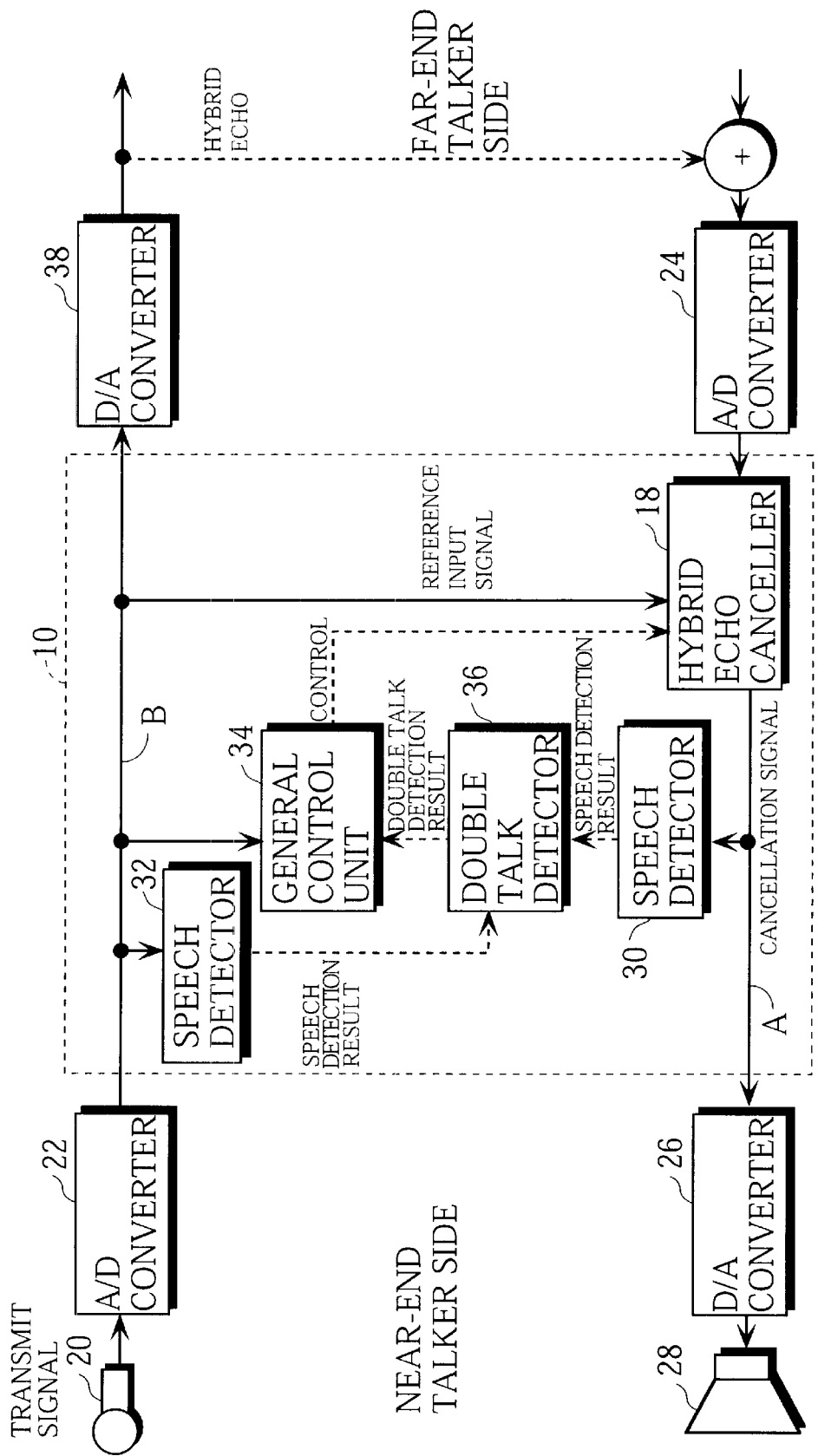
FIG. 2 is a functional block diagram showing a functional configuration of the echo canceller of FIG. 1.

FIG. 1 diagrammatically illustrates an electrical configuration of an echo cancelling apparatus hereof whereas FIG. 2 diagrammatically illustrates a functional configuration of the echo cancelling apparatus of FIG. 1. The echo cancelling apparatus shown herein serves to cancel hybrid echos.

An echo cancelling apparatus 10 includes a DSP (or CPU) 12, a ROM 14 and a RAM 16.

The ROM 14 serves to store a control program for the DSP 12 and predetermined data. The ROM 14 stores the following data.
(1) Threshold value "Learn_lev_thl" used for determining whether or not a transmit signal level "Send_lev" is sufficient for permitting a learning operation;
(2) Background noise calculation level "Thl_base"
(3) Upward modification unit "T_up" for background noise calculation level "Thl_base";
(4) Downward modification unit "T_down" for background noise calculation level "Thl_base";
(5) Multiplier "a" used for determining threshold value "Thl_1" or "Thl_2" from background noise calculation level "Thl_base";
(6) Indeterminate condition duration "N" used for determining the presence of the double talk condition.

The RAM 16 serves to store a variety of flags and necessary data, which include the followings:
(1) Flag "Double_flg" for holding information as to whether or not the double talk condition is present (0: no double talk, 1: double talk);
(2) Flag "Study_flg" for holding information as to whether or not the learning operation is permitted (0: learning operation inhibited, 1: earning operation permitted);
(3) Flag "Speech_flg_1" for holding a detection result of a speech detector 30, which result indicates the presence or absence of speech (0: absence of speech, 1: presence of speech);
(4) Flag "Speech_flg_2" for holding a detection result of a speech detector 32, which result indicates the presence or absence of speech (0: absence of speech, 1: presence of speech);
(5) Transmit signal Level "Send_lev";
(6) Thresholds "Thl_1", "Thl_2" used for determining the presence or absence of speech;
(7) Level "in_lev" of a signal indicating a result of echo cancellation performed by a hybrid (line-side) echo canceller 18; and
(8) Count value "Counter" indicative of an indeterminate condition duration.

A transmit signal through a microphone 20 is converted to digital form by an A/D converter 22 and then applied to the echo cancelling apparatus 10.

The hybrid echo canceller 18 receives the transmit signal thus digitized by the A/D converter 22 as a reference input signal, which is used for calculating an echo replica signal. The echo replica signal is subtracted from a signal (a receive signal +a hybrid echo) sent from an A/D converter 24. The subtraction result (echo cancellation result) is converted to analog form by an D/A converter 26 so as to be outputted from a speaker 28 as a speaker output signal. The hybrid echo canceller 18 updates an adaptive filter coefficient based on the reference input signal, an adaptive filter coefficient and the echo cancellation result.

The speech detector 30 calculates a level "in_lev" of a signal representing the:result of echo cancellation done by the hybrid echo canceller 18 and compares the signal level "in_lev" with a threshold value "Thl_1" thereby to determine whether a speech signal sent through a receive path A indicates the presence of speech or the absence of speech.

The speech detector 32 calculates a level "Send_lev" of the transmit signal from the A/D converter 22 and compares the transmit signal level "Send_lev" with a threshold value "Thl_2" thereby to determine whether a speech signal sent through a transmit path B indicates the presence of speech or the absence of speech.

A general control unit 34 calculates a level "Send_lev" of the transmit signal from the A/D converter 22 and compares the transmit signal level "Send_lev" with the threshold value "Learn_lev_thl" thereby to determine whether or not the transmit signal level "Send_lev" is sufficient for permitting a learning operation.

The level "in_lev" of the signal indicative of the echo cancellation result and the transmit signal level "Send_lev" are each given by summing up squares of 20 continuous samples extracted at a sampling frequency of 8 KHz. The same calculation is performed in a second embodiment to be described later herein.

Speech detection results from the speech detectors 30, 32 are applied to a double talk detector 36. Based on these speech detection, results, the double talk detector 36 determines whether a double talk condition is present or not and then applies the double talk detection result to the general control unit 34.

Based on the determination as to whether or not the transmit signal level "Send_lev" is sufficient for permitting the learning operation and the double talk detection result, the general control unit 34 determines whether the hybrid echo canceller 18 is permitted to perform the learning operation or not. Based on this determination, the general control unit controls the learning operation of the hybrid echo canceller 18.

The transmit signal digitized by the A/D converter 22 is converted back to analog form by a D/A converter 38 and thereafter is outputted as a hybrid output signal.

Figure 3:
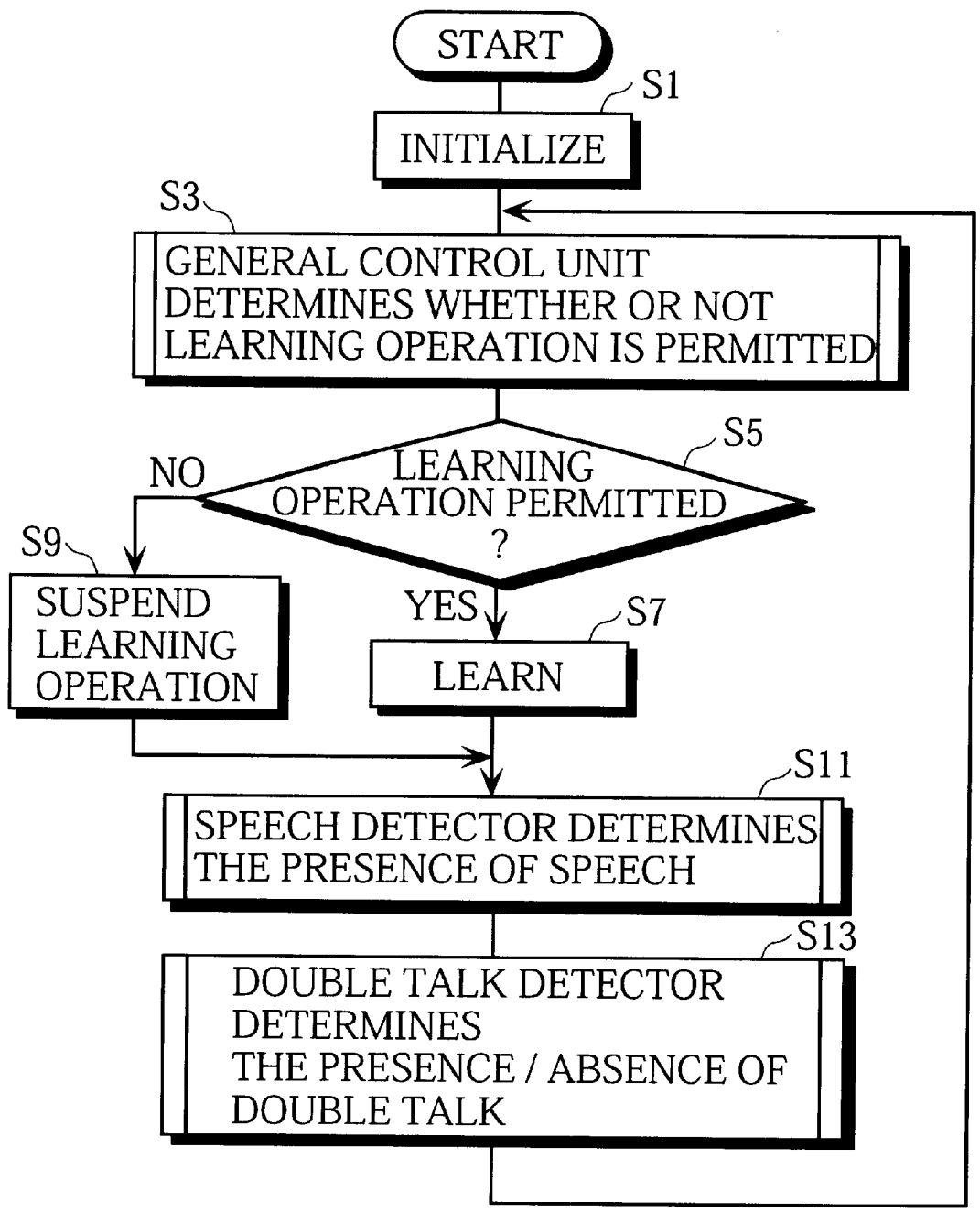
FIG. 3 is a flow chart showing a general procedure taken by the echo canceller of FIG. 1.

FIG. 3 represents a general procedure taken by the echo cancelling apparatus 10.

Referring to FIG. 3, initializations are first performed on various flags such as "Double flg", "Study_flg", "Speech_flg_1", and "Speech_flg_2" as well as on various data such as "Send_lev", "Thl_1", "Thl_2", "in_lev" and "Counter", which are all stored in the RAM 16 (Step S1).

Subsequently, the general control unit 34 determines whether the learning operation is permitted or not. If the learning operation is permitted, the general control unit sets "Study_flg" to (Study_flg=1) whereas if the learning operation is not permitted, the general control unit resets "Study_flg" to (Study_flg=0) (Step S3).

If the learning operation is permitted or Study_flg=1 (YES in Step S5), the hybrid echo canceller 18 performs the learning operation (Step S7). If the learning operation is not permitted or Study_flg=0 (NO in Step S5), the learning operation of the hybrid echo canceller 18 is suspended (Step S9).

Subsequently, the speech detectors 30, 32 determine whether the speech signals sent through the receive path A and the transmit path B respectively indicate the presence of speech or the absence of speech so that the flag "Speech_flg_1" and the flag "Speech_flg_2" are set or reset according to the respective judgments (Step S11).

Where the speech signal sent through the receive path A indicates the presence of speech, the flag "Speech_flg_1" is set (Speech_flg_1=1). In the case of the absence of speech, the flag "Speech_flg_1" is reset (Speech_flg_1=0). Where the speech signal sent through the transmit path B indicates the presence of speech, the flag "Speech_flg_2" is set (Speech_flg2=1) In the case of the absence of speech, the flag "Speech_flg_2" is reset ("Speech_flg_2=0).

Next, the double talk detector 36 determines whether the double talk condition is present or not based on the states of the flag "Speech flg_1" and the flag "speech_flg_2". The flag "Double_flg_2" is either set or reset according to the determination (Step S13).

Figure 4:
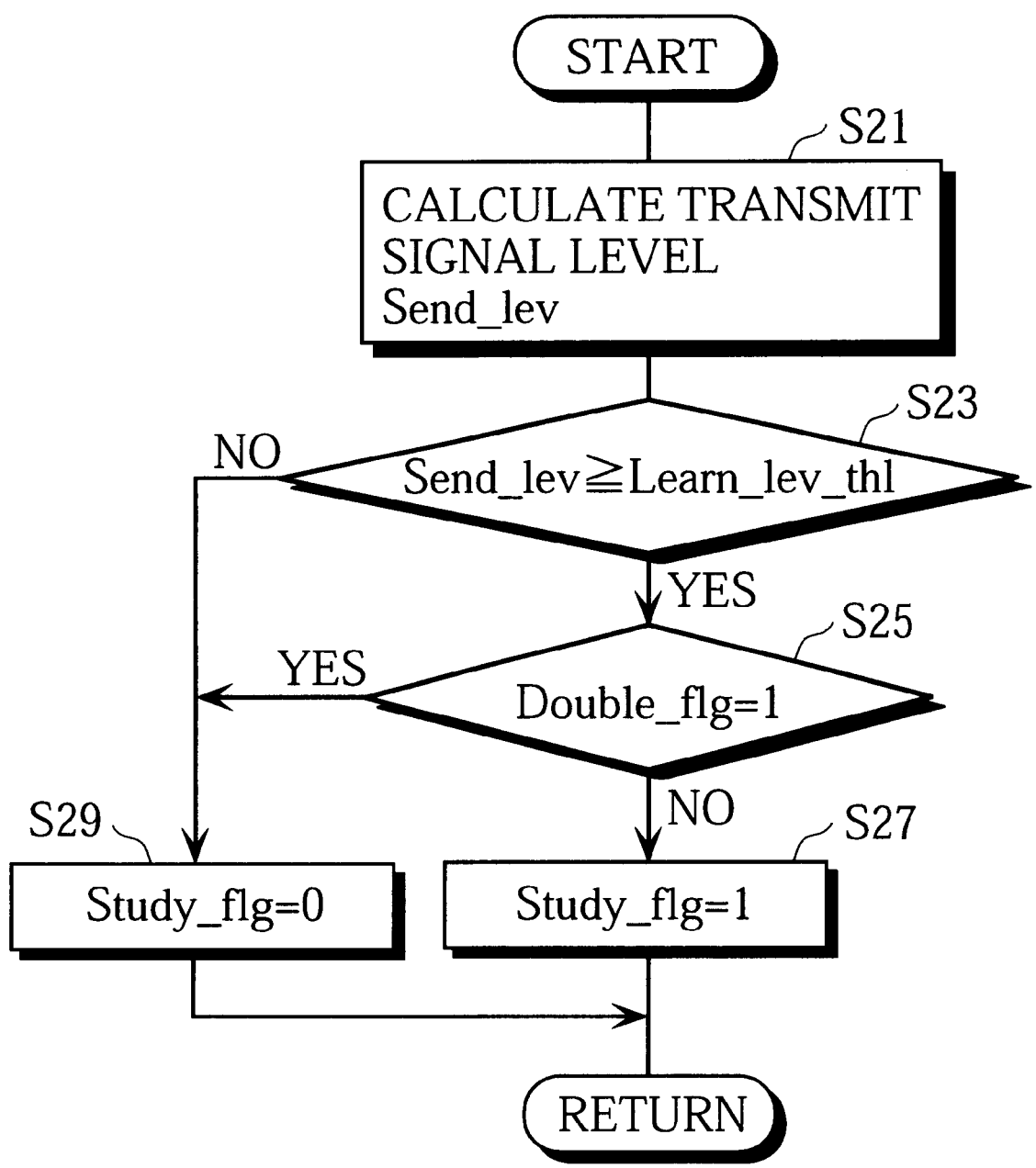
FIG. 4 is a flow chart illustrating a detailed procedure taken by Step S3 shown in FIG. 3.

FIG. 4 illustrates a procedure taken by Step S3 shown in FIG. 3.

First, the general control unit 34 calculates a transmit signal level "Send_lev" (Step S21) so as to determine whether or not the transmit signal level "Send_lev" is not less than the threshold value "Learn_lev_thl" (Send_lev≧Learn_lev_thl) (Step S23).

If the transmit signal level "Send_lev" is not less than the threshold value "Learn_lev_thl", the transmit signal level "Send_lev" is determined to be sufficient for permitting the hybrid echo canceller 18 to perform the learning operation. Then, the flag "Double_flg" is checked to determine whether it is set (Double_flg=1) or not (Step S25).

Where the flag "Double_flg" is reset (Double_flg=0), it is determined that the learning operation is permitted and the flag "Study_flg" is set (Study_flg=1) (Step S27).

In short, where the transmit signal level "Send_lev" is not less. than the threshold value "Learn_lev_thl" and the double talk condition is absent (Double_flg=0), it is determined that the learning operation is permitted and the flag "Study_flg" is set (Study_flg=1).

In the case of "NO" given by Step S23 or "YES" given by Step S25, it is determined that the learning operation is inhibited and the flag "Study_flg" is reset (Study_flg=0) (Step S29). Briefly, where the transmit signal level "Send_lev" is less than the threshold value "Learn_lev_thl", or where the transmit signal level "Send_lev" is not less than the threshold value "Learn_lev_thl" but the double talk condition is present (Double_flg=1), it is determined the learning operation is inhibited and the flag "Study_flg" is reset (Study_flg=0).

Figure 5:
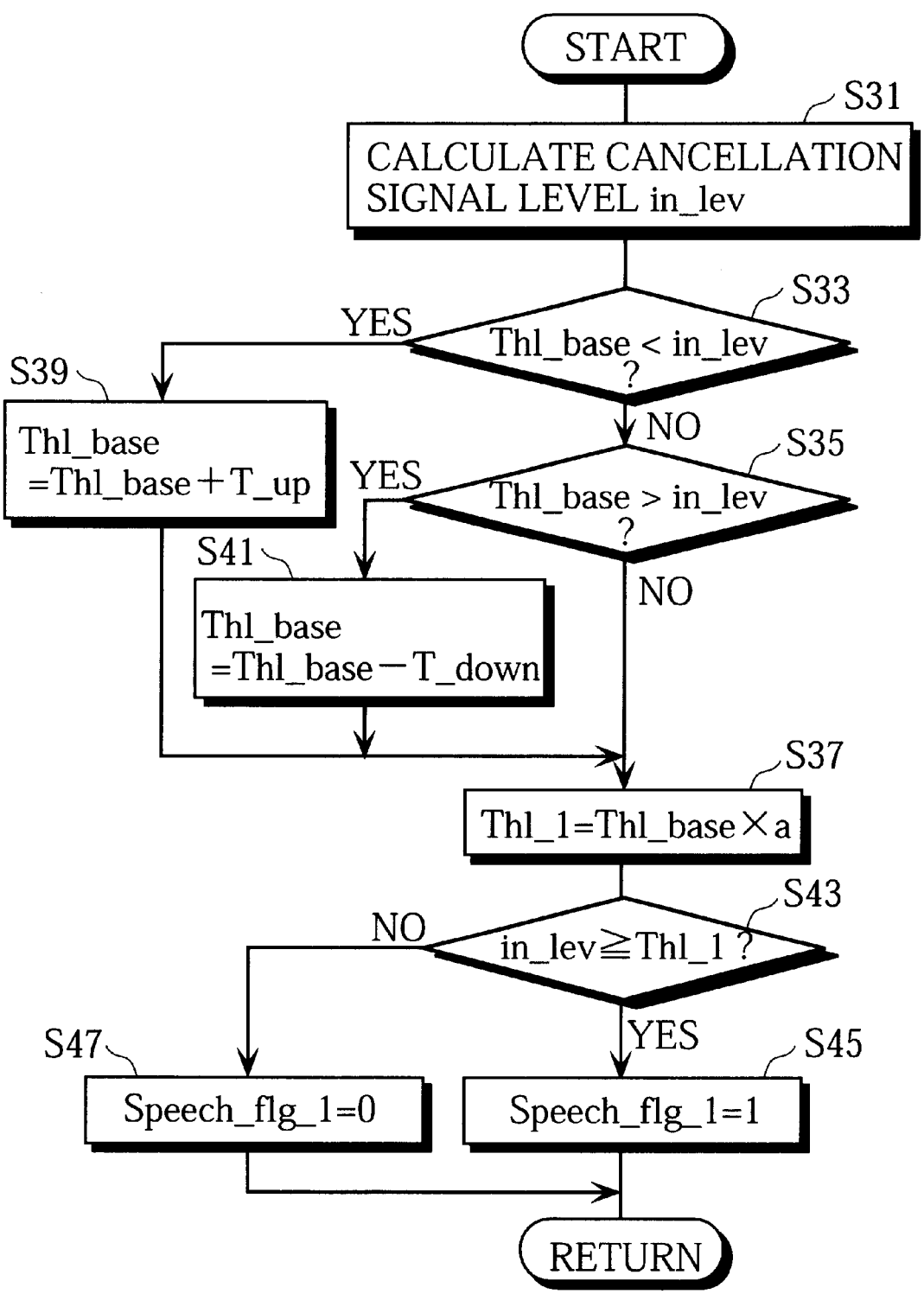
FIG. 5 is a flow chart illustrating a detailed procedure taken by Step S11 shown in FIG. 3.

FIG. 5 illustrates a: procedure taken by Step S11 shown in FIG. 3. The description will be made by way of example of the speech detector 30 determining whether the speech signal sent through the receive path A includes speech or not.

First, the speech detector 30 calculates a level "in_lev" of the signal indicating the echo cancellation result (Step S31) so as to determine whether or not the signal level "in_lev" is greater than a background noise calculation level "Thl_base" (Thl_base<in_lev) (Step S33).

If the signal level "in_lev" does not exceed the background noise calculation level "Thl_base", judgment is made as to whether the signal level "in_lev" is smaller than the background noise calculation level "Thl_base" (Thl_base>in_lev) or not (Step S35).

If the signal level "in_lev" is not smaller than the background noise calculation level "Thl_base" or the background noise calculation level "Thl_base" is equal to the signal level "in_lev" (Thl_base=in_lev), the background noise calculation level "Thl_base" is not modified but the threshold value "Thl_1" used by the speech detector 30 for determination of the presence/absence of speech is modified based on the following expression (1) (Step S37):

$$Thl\_1 = Thl\_base \times a \quad (1)$$

If the signal level "in_lev" is determined to be greater than the background noise calculation level "Thl_base" (Thl_base<in_lev) in the above Step S33, the background noise calculation level "Thl_base" is modified to a greater value based on the following expression (2) (Step S39) and then, the flow proceeds to Step S37:

$$Thl\_base = Thl\_base + T\_up \quad (2)$$

If the signal level "in_lev" is determined to be smaller than the background noise calculation level "Thl_base" (Thl_base>in_lev) in the above Step S35, the background noise calculation level "Thl_base" is modified to a smaller value based on the following expression (3) (Step S41) and then, the flow proceeds to Step S37:

$$Thl\_base = Thl\_base - T\_down \quad (3)$$

In this manner, the background noise calculation level "Thl_base" and the threshold value "Thl_1" are adjusted to optimum values depending upon the conditions.

Subsequent to Step S37, the signal level "in_lev" is checked to determine whether or not the signal level is not less than the threshold value "Thl_1" (in_lev≧Thl_1) (Step S43). If the signal level "in_lev" is not less than the threshold value "Thl_1", the speech signal sent through the receive path A is determined to include speech so that the flag "Speech_flg_1" is set (Speech_flg_1=1) (Step S45).

If the signal level "in_lev" is less than the threshold value "Thl_1", the speech signal sent through the receive path A is determined to include no speech so that the flag "Speech_flg_1" is reset (Speech_flg_1=0) (Step S47).

The speech detector 32 takes substantially the same procedure as that shown in FIG. 5 for determination as to whether the speech signal sent through the transmit path B indicates the presence of speech or the absence of speech. The flag "Speech_flg_2" is either set or reset according to the determination. For determination as to whether the speech signal sent through the transmit path B includes speech or not, the threshold value "Thl_2" is used instead of the threshold value "Thl_1" and the transmit signal level "Send_lev" instead of the level "in_lev" of the signal indicating the echo cancellation result. In most cases, the threshold values "Thl_1" and "Thl_2" have different values because they are discretely defined.

By defining a small upward modification unit "T_up" and a great downward modification unit "T_down", the background noise calculation level "Thl_base" varies such that the time constant is great at the rise time and is small at the fall time. This permits the background noise calculation level "Thl_base" to be maintained at a value close to an actual background noise level.

Figure 6:
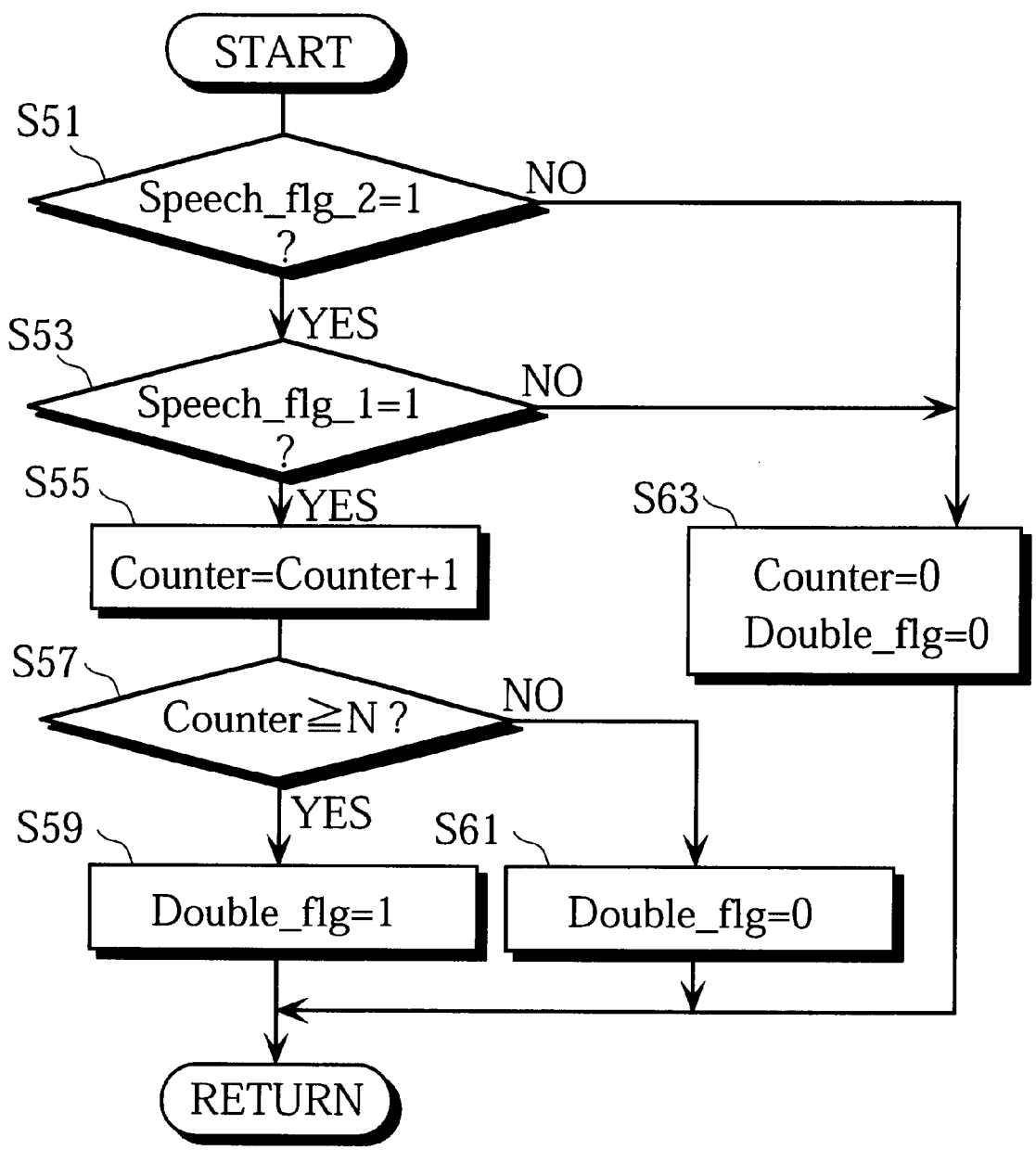
FIG. 6 is a flow chart illustrating a detailed procedure taken by Step S13 shown in FIG. 3.

FIG. 6 illustrates a procedure taken by Step 513 shown in FIG. 3.

First, the flag "Speech_flg_2" indicative of a result of the speech detection by the speech detector 32 is checked to determine whether it is set (Speech_flg_2=1) or not (Step S51). If the flag "Speech_flg_2" is set (Speech_flg_2=1), the flag "Speech_flg_1" indicative of a result of the speech detection by the speech detector 30 is checked to determine whether it is set (Speech_flg_1=1) or not (Step S53).

If the flag "Speech_flg_1" is set (Speech_flg_1=1) a count value "Counter" indicative of a duration of an indeterminate condition is incremented by one (Step S55) and then, whether or not "Counter" is not less than N (Counter≧N) is determined (Step S57). If Counter≧N, the double talk condition is determined to be present so that the flag "Double_flg" is set (Double_flg=1) (Step S59). It is to be noted that the value of the indeterminate condition duration is defined with a learning speed of the hybrid echo canceller 18 taken into consideration.

If Counter<N in Step S57, the speech signals sent through the receive path A and the transmit path B both include speeches but the duration of the speeches is short and hence, it is determined that an indeterminate condition such as associated with echo path changes is present rather than the double talk condition. Accordingly, the flag "Double_flg" is reset (Double_flg=0) (Step S61). if the flag "Speech_flg_2" is not set (Speech_flg_2=0) in the aforesaid Step S51, or if the flag "Speech_flg_1" is not set (Speech_flg_1=0) in the aforesaid Step S53, it is determined that the single talk condition is present and the count value "Counter" and the flag "Double_flg" are both reset (Counter=0, Double_flg=0) (Step S63).

In the aforesaid echo cancelling apparatus, the speech detector 30 detects speech upon input of a far-end talker's speech. When, on the other hand, a near-end talker's speech is outputted, a hybrid echo thereof is reflected back. However, the speech detector 30 does not detect the near-end talker's speech as long as the echo is adequately removed by the hybrid echo canceller 18. That is, the hybrid echo canceller 18 functions to prevent the input of the hybrid echo to the speech detector 30, thus contributing to an enhanced accuracy of the double talk detection.

In an event that the double talk condition is produced by a far-end talker's speech at such a low level that the speech detector 30 fails to detect the speech but the learning operation of the hybrid echo canceller 18 is adversely affected, the presence of the double talk condition is not determined despite the actual occurrence of the double talk condition and therefore, the hybrid echo canceller 18 performs the learning operation.

However, the learning operation of the hybrid echo canceller 18 results in corruption of the adaptive filter coefficient in the hybrid echo canceller 18. This leads to an increased echo cancellation error such that an echo of the far-end talker's speech or the near-end talker's speech is detected as speech by the speech detector 30 and hence, the presence of the double talk condition is determined. Consequently, the learning operation of the hybrid echo canceller 18 is suspended.

Thus, when there occurs such a double talk condition as to affect the learning operation of the hybrid echo canceller 18, the occurrence of the double talk condition is assuredly detected despite the low input level.

Where the double talk condition is produced by the far-end talker's speech at such an even lower level that the speech detector 30 fails to determine the presence of speech but the learning operation of the hybrid echo canceller 18 is not adversely affected, the corruption of the adaptive filter coefficient in the hybrid echo canceller 18 is too small to result in the increased echo cancellation error. In this case, the learning operation of the hybrid echo canceller 18 is not suspended because the speech detector 30 fails to determine the presence of speech. However, the corruption of the adaptive filter coefficient in the hybrid echo canceller 18 is too small to cause any trouble.

As described above, the echo cancelling apparatus 10 does not depend upon the input/output speech level for the detection of the double talk condition. Thus, the echo cancelling apparatus ensures an accurate detection of the double talk condition without suffering the influence of the variations in the transmit signal level "Send_lev", the receive signal level and the like. Accordingly, the hybrid echo canceller 18 ensures stable echo cancelling operations.

In addition, the speech detectors 30, 32 are adapted to circumvent malfunctions due to noise by virtue of the respective threshold values "Thl_1" and "Thl_2" therefor automatically following the variations in the background noise level. Thus, the accuracy of the double talk detection is further improved. It seems, in this case, that the threshold values "Thl_1" and "Thl_2" increase with increase in the noise level thereby to degrade the accuracy of the double talk detection. However, the hybrid echo canceller 18 is incapable of achieving the echo cancellation over an S/N ratio of the input signal and therefore, no problem results.

In addition, a need exists for providing a control over the echo canceller such that the occurrence of the double talk condition is responded by the suspension of the learning operation, which is continued when the impulse response of the echo path merely varies. Unfortunately, it is difficult to discriminate between the double talk condition and the echo path variation which are both responsible for the degradation of the echo cancellation accuracy.

The above echo cancelling apparatus 10 is adapted to continue the learning operation for a given period of time despite the presence of speeches determined by both speech detectors 30, 32 and to count the duration of the speeches in order to make judgment in the following manner. Specifically, if the count of the duration exceeds the indeterminate condition duration N, the double talk condition is determined to be present. On the other hand, if either of the speech detections by the speech detectors 30, 32 indicates the absence of speech before the count for the duration of the speeches reaches the indeterminate condition duration N, it is determined that the impulse response of the echo path has merely varied. Thus, the occurrence of the double talk condition is discriminated from the mere variation in the impulse response of the echo path. This enables the implementation of controls suitable for the respective conditions.

Figure 7:
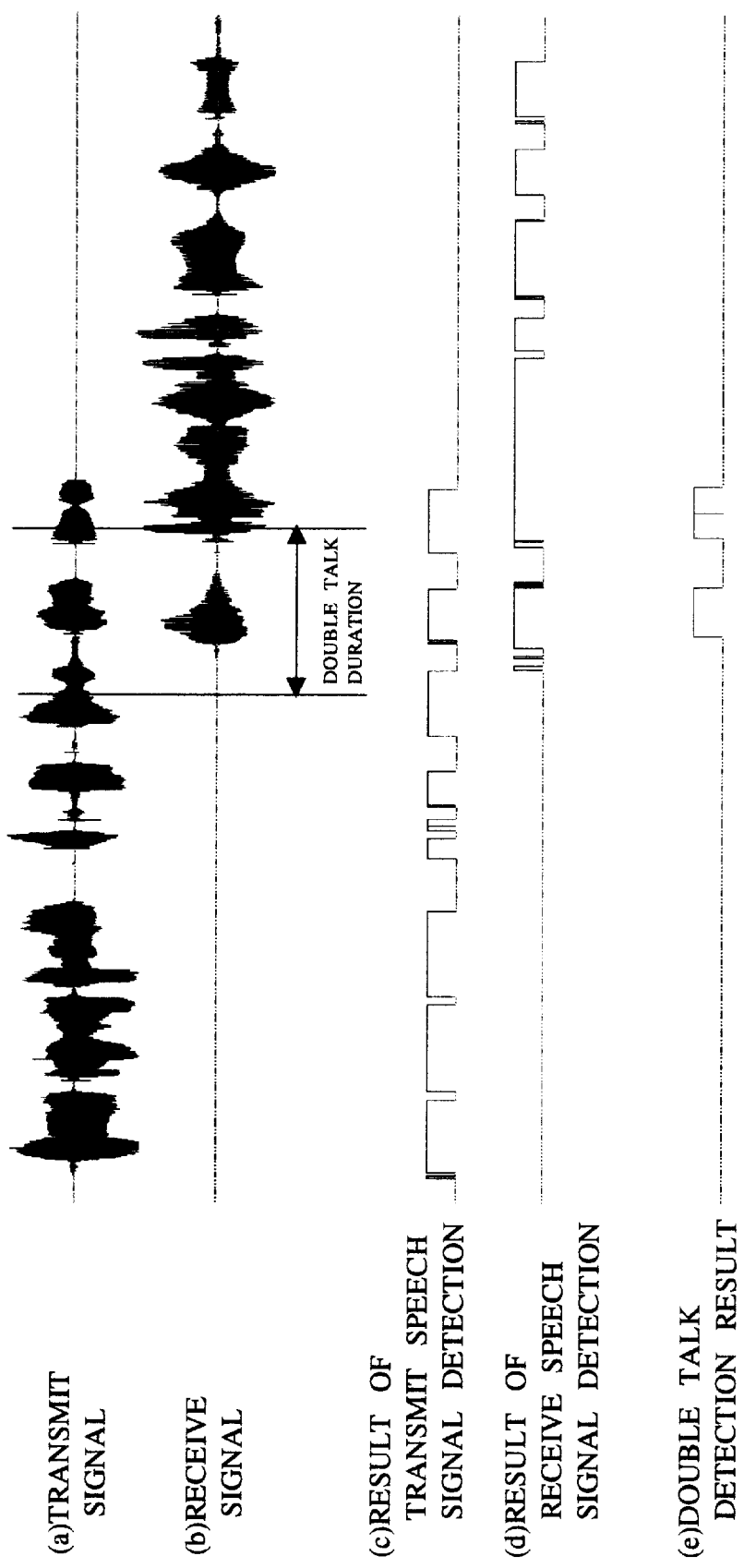
FIGS. 7a to 7e are a timing chart showing signals in different units shown in FIG. 2.

FIG. 7 illustrates an exemplary double talk detection done by the echo cancelling apparatus 10.

With a transmit signal as shown in FIG. 7a and a receive signal as shown in FIG. 7b, the speech detector 32 detects speech in the transmit signal as shown in FIG. 7c whereas the speech detector 30 detects speech in the receive signal as shown in FIG. 7d. As a result, the double talk detector 36 provides a double talk detection as shown in FIG. 7e, which demonstrates the accurate detection of a double talk duration.

Although the echo cancelling apparatus 10 hereof includes the hybrid echo canceller 18 as shown in FIG. 2, the invention should not be limited to this but may include an acoustic (a sound-side) echo canceller. As a matter of course, the DSP 12 may be replaced by a CPU.

[2] Second Embodiment

Figure 8:
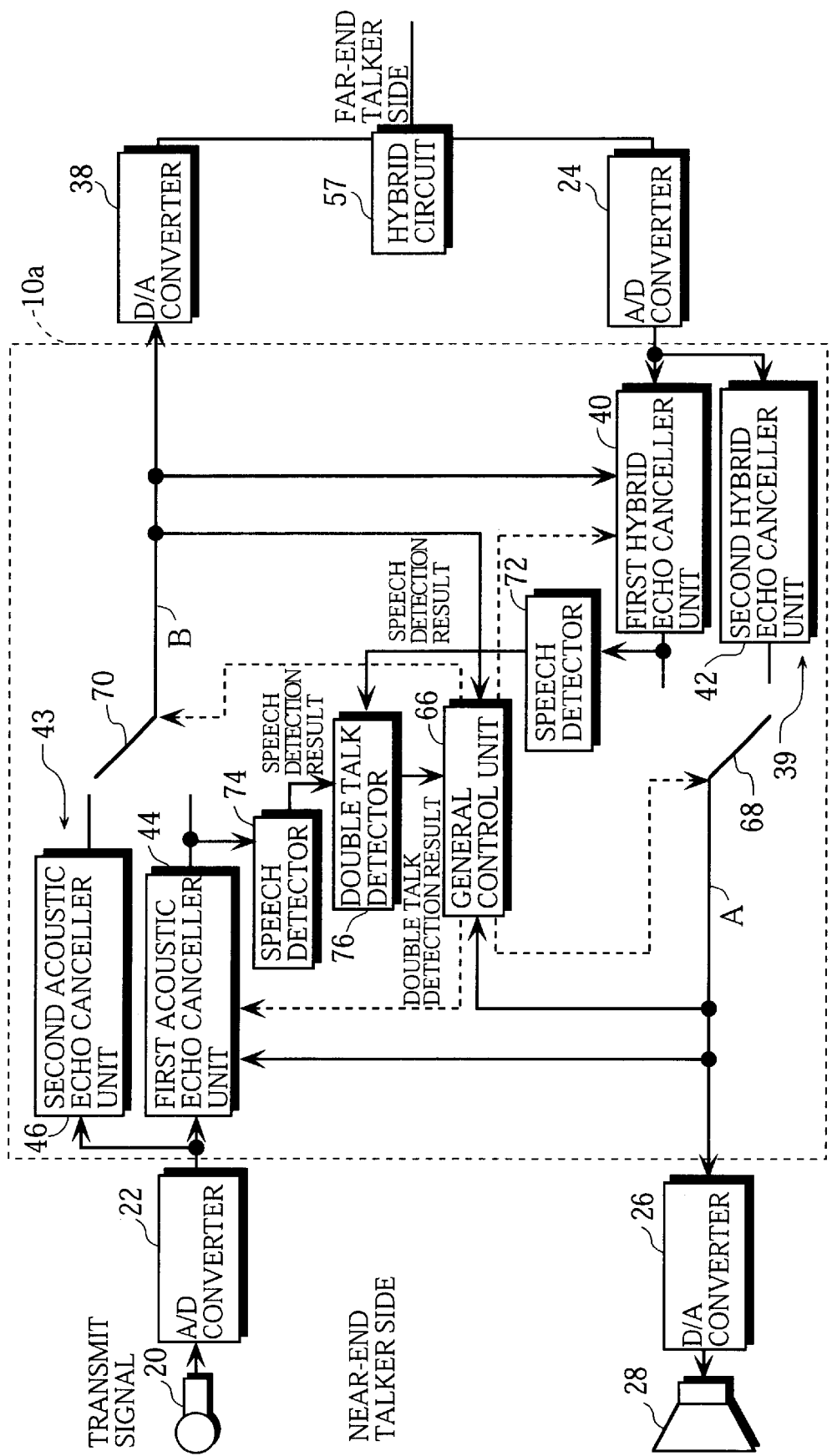
FIG. 8 is a functional block diagram showing a functional configuration of an echo canceller according to an another embodiment of the invention.

FIG. 8 diagrammatically illustrates a functional configuration of an echo cancelling apparatus 10a. Similarly to the echo cancelling apparatus 10 shown in FIG. 1, the echo cancelling apparatus 10a includes the DSP 12, ROM 14 and RAM 16.

In addition to the various flags mentioned in conjunction with the first embodiment, the RAM 16 further stores therein a flag "Check_flg" indicative of the indeterminate condition (0: no indeterminate condition, 1: indeterminate condition)

and a counter value "Back_cnt" used for backing up the adaptive filter coefficient.

In the RAM 16, the flag "Speech_flg_1" holds a speech detection result provided by a speech detector 72 whereas the flag "Speech_flg_2" holds a speech detection result provided by a speech detector 74.

In addition to the data mentioned in conjunction with the first embodiment hereof, the ROM 14 further stores a threshold value M used for determination of a timing to back up the adaptive filter coefficient.

The echo cancelling apparatus 11a is configured as a full-duplex echo canceller including a hybrid echo canceller 39 and an acoustic echo canceller 43.

The hybrid echo canceller 39 includes a first hybrid echo canceller unit 40 and a second hybrid echo canceller unit 42. The acoustic echo canceller 43 includes a first acoustic echo canceller unit 44 and a second acoustic echo canceller unit 46.

Figure 9:
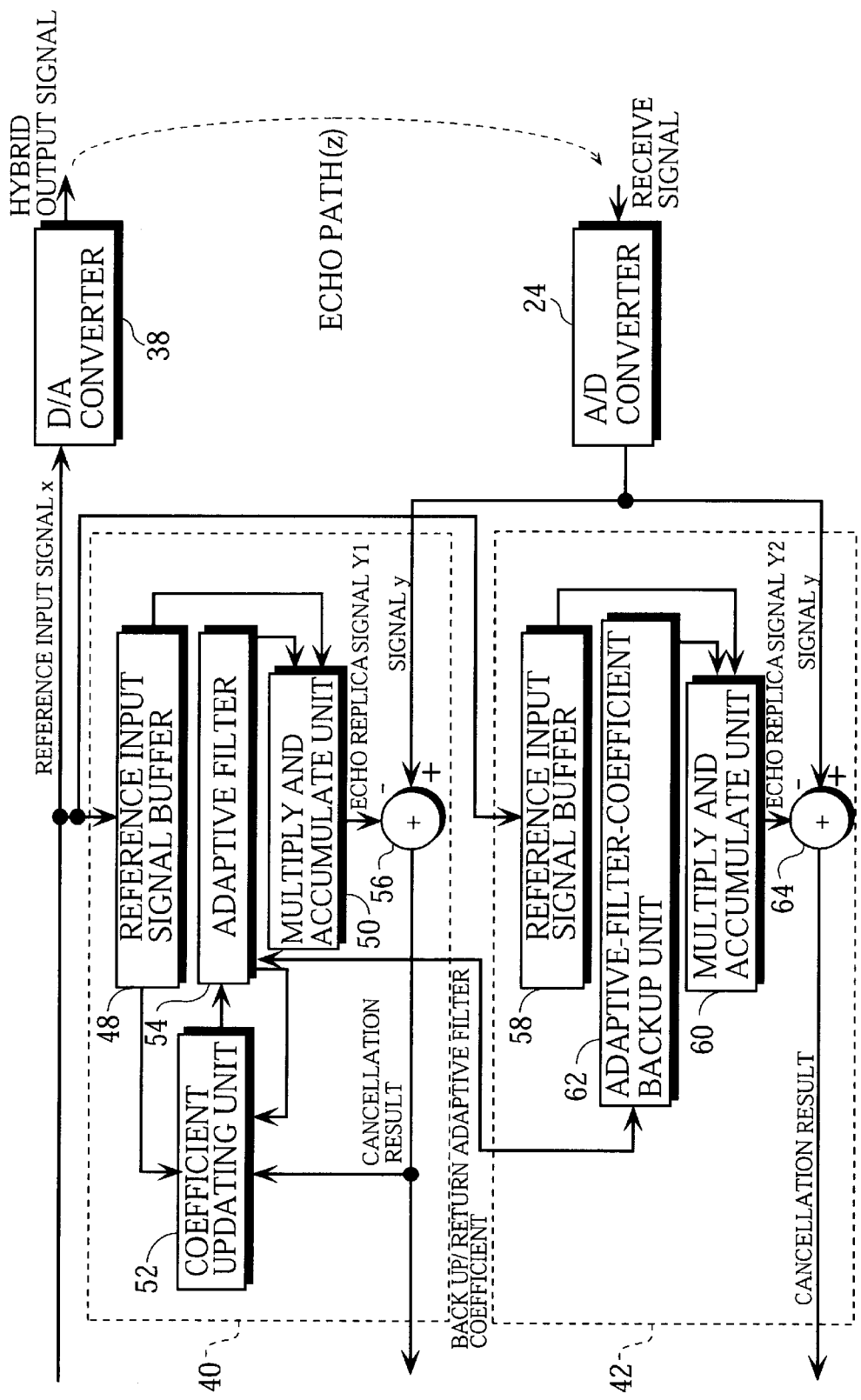
FIG. 9 is a functional block diagram showing configurations of a hybrid echo canceller unit for learning/cancelling and of a hybrid echo canceller unit for cancelling shown in FIG. 8.

FIG. 9 diagrammatically illustrates a functional configuration of the first hybrid echo canceller unit 40 and the second hybrid echo canceller unit 42.

The first hybrid echo canceller unit 40 includes a reference input signal buffer 48, a multiply and accumulate unit 50, a coefficient updating unit 52, an adaptive filter 54 and a subtractor 56.

The reference input signal buffer 48 is applied with an echo cancellation result, as a reference input signal X, by the first acoustic echo canceller 44 or the second acoustic echo canceller 46. The reference input signal X stored in the reference input signal buffer 48 is applied to the multiply-:and accumulate unit 50 and the coefficient updating unit 52 at a predetermined timing.

The multiply and accumulate unit 50 generates an echo replica signal Y1 by using the reference input signal X and an adaptive filter coefficient of the adaptive filter 54, such as composed of an FIR (Finite Impulse Response) filter.

Subsequently, the subtractor 56 subtracts the echo replica signal Y1 from a signal y {(a receive signal via a hybrid circuit 57)+(a signal obtained by converting a hybrid echo to digital form)} and outputs the subtraction result (echo cancellation result).

The coefficient updating unit 52 updates the adaptive filter coefficient based on the reference input signal X, an adaptive filter coefficient and the output (echo cancellation result) from the subtractor 56.

Thus, the first hybrid echo canceller unit 40 serves to remove the echo as updating the adaptive filter coefficient or carrying out the learning operation.

Specifically, under the single talk condition, the first hybrid echo canceller 40 carries out the learning operation while causing a backup unit 62 of the second hybrid echo canceller unit 40 to regularly back up the adaptive filter coefficient.

Under the indeterminate condition, the first hybrid echo canceller unit 40 continues the learning operation but the adaptive filter coefficient is not backed up.

Under the double talk condition, the first hybrid echo canceller unit 40 suspends the learning operation. Further, the adaptive filter coefficient backed up by the backup unit 62 is returned to the adaptive filter 54 because the coefficient has already been corrupted.

The second hybrid echo canceller unit 42 includes a reference input signal buffer 58, a multiply and accumulate unit 60, the adaptive-filter-coefficient backup unit 62, and a subtractor 64.

Similarly to the reference input signal buffer 48 of the first hybrid echo canceller unit 40, the reference input signal buffer 58 is applied with an echo cancellation result, as the reference input signal X, by the first acoustic echo canceller unit 44 or the second acoustic echo canceller unit 46. The reference input signal X stored in the buffer 58 is applied to the multiply and accumulate unit 60 at a predetermine timing.

The adaptive-filter_coefficient backup unit 62 serves to back up the adaptive filter coefficient of the adaptive filter 54 in the first hybrid echo canceller unit 40 and applies the adaptive filter coefficient to the multiply and accumulate unit 60.

The multiply and accumulate unit 60 calculates an echo replica signal Y2 based on the reference input signal X and the adaptive filter coefficient. The subtractor 64 subtracts the echo replica signal Y2 from the signal y from the A/D converter 24 for outputting the subtraction result (echo cancellation result).

During the single talk condition, the adaptive filter coefficient is backed up by the backup unit 62. When the transmit signal level "Send_lev" is not sufficient for permitting the learning operation or the double talk condition is present, the adaptive filter coefficient backed up by the backup unit 62 is returned to the adaptive filter 54 so that the coefficient is used by the multiply and accumulate unit 50 for the multiplying and accumulating operation and by the coefficient updating unit 52 for the adaptive filter coefficient update.

Thus, the second hybrid echo canceller unit 42 only performs the echo cancellation by using the backed up adaptive filter coefficient but does not learn the filter coefficient.

The first acoustic echo canceller unit 44 and the second acoustic echo canceller unit 46 are respectively configured the same way as the first hybrid echo canceller unit 40 and the second hybrid echo canceller unit 43 and therefore, the description thereof is omitted.

Referring to FIG. 8, switches 68, 70 are controlled by a general control unit 66. Under the single talk condition, the switches 68, 70 are respectively caused to select outputs (echo cancellation results) from the first hybrid echo canceller unit 40 and the first acoustic echo canceller unit 44 which perform the echo cancellations concurrently with the learning operations.

Under the other conditions than the single talk condition, the outputs (echo cancellation results) from the first hybrid echo canceller unit 40 and the first acoustic echo canceller unit 44 are probably degraded. Therefore, the switches 68, 70 are respectively caused to select outputs from the second hybrid echo canceller unit 42 and the second acoustic echo canceller unit 46.

Of the outputs from the first hybrid echo canceller unit 40 and the second hybrid echo canceller unit 42, an output (echo cancellation result) selected by the switch 68 is converted to analog form by the D/A converter 26 and thereafter, outputted from the speaker 28 as the speaker output signal.

The echo cancellation result selected by the switch 68 is also sent to the general control unit 66 as well as applied, as the reference input signal X, to the first acoustic echo canceller unit 44. The general control unit 66, in turn, checks the signal level "in_lev" of the echo cancellation result selected by the switch 68 so as to determine whether the first acoustic echo canceller unit 44 is permitted to learn or not.

Of the outputs from the first acoustic echo canceller unit 44 and the second acoustic echo canceller unit 46, an output (echo cancellation result) selected by the switch 70 is converted to analog form by the D/A converter 38 and then outputted as the hybrid output signal.

The echo cancellation result selected by the switch 70 is sent to the general control unit 66 and also applied, as the reference input signal X, to the first hybrid echo canceller unit 40. The general control unit 66 checks the signal level "in_lev" of the echo cancellation result selected by the switch 70 so as to determine whether the first hybrid echo canceller unit 40 is permitted to learn or not.

The speech detector 72 calculates a signal level "in_lev" of the cancellation result provided by the first hybrid echo canceller unit 40 and, similarly to the first embodiment, compares the signal level "in_lev" with the threshold value "Thl_1" thereby determining whether the speech signal sent through the receive path A indicates the presence of speech or the absence of speech.

Likewise, the speech detector 74 compares the signal level "in_lev" of the cancellation result provided by the first acoustic echo canceller unit 44 with the threshold value "Thl_2" thereby determining whether the speech signal sent through the transmit path B indicates the presence of speech or the absence of speech.

In short, the double talk detection is performed by using the outputs from the first hybrid echo canceller unit 40 and the first acoustic echo canceller unit 44 for increased accuracy of the double talk detection.

The respective speech detection results from the speech detectors 72, 74 are applied to a double talk detector 76. Based on these speech detection results, the double talk detector 76 determines whether the double talk condition is present or not and applies the determination to the general control unit 66.

The general control unit 66 provides the following controls over the hybrid echo canceller 39:

(1) Controlling the switch 68 based on the determination as to whether or not the transmit signal level "Send_lev" is sufficient for permitting the learning operation and on the double talk detection result;

(2) Controlling the learning operation of the first hybrid echo canceller unit 40;

(3) Causing the backup unit 62 in the second hybrid echo canceller unit 42 to back up the adaptive filter coefficient of the adaptive filter 54 in the first hybrid echo canceller unit 40; and (4) Returning the adaptive filter coefficient held by the backup unit 62 in the second hybrid echo canceller unit 42 to the adaptive filter 54 in the first hybrid echo canceller unit 40.

The general control unit 66 provides the following controls over the acoustic echo canceller 43:

(1) Controlling the switch 70 based on the determination as to whether or not the receive signal level is sufficient for permitting the learning operation and on the double talk detection result;

(2) Controlling the learning operation of the first acoustic echo canceller unit 44;

(3) Causing the backup unit in the second acoustic echo canceller unit 46 to back up the adaptive filter coefficient of the adaptive filter in the first acoustic echo canceller unit 44; and (4) Returning the adaptive filter coefficient held by the backup unit in the second acoustic echo canceller unit 46 to the adaptive filter in the first acoustic echo canceller unit 44.

Now referring to FIGS. 10 to 12, the operations of the echo cancelling apparatus 10a will be described.

Figure 10:
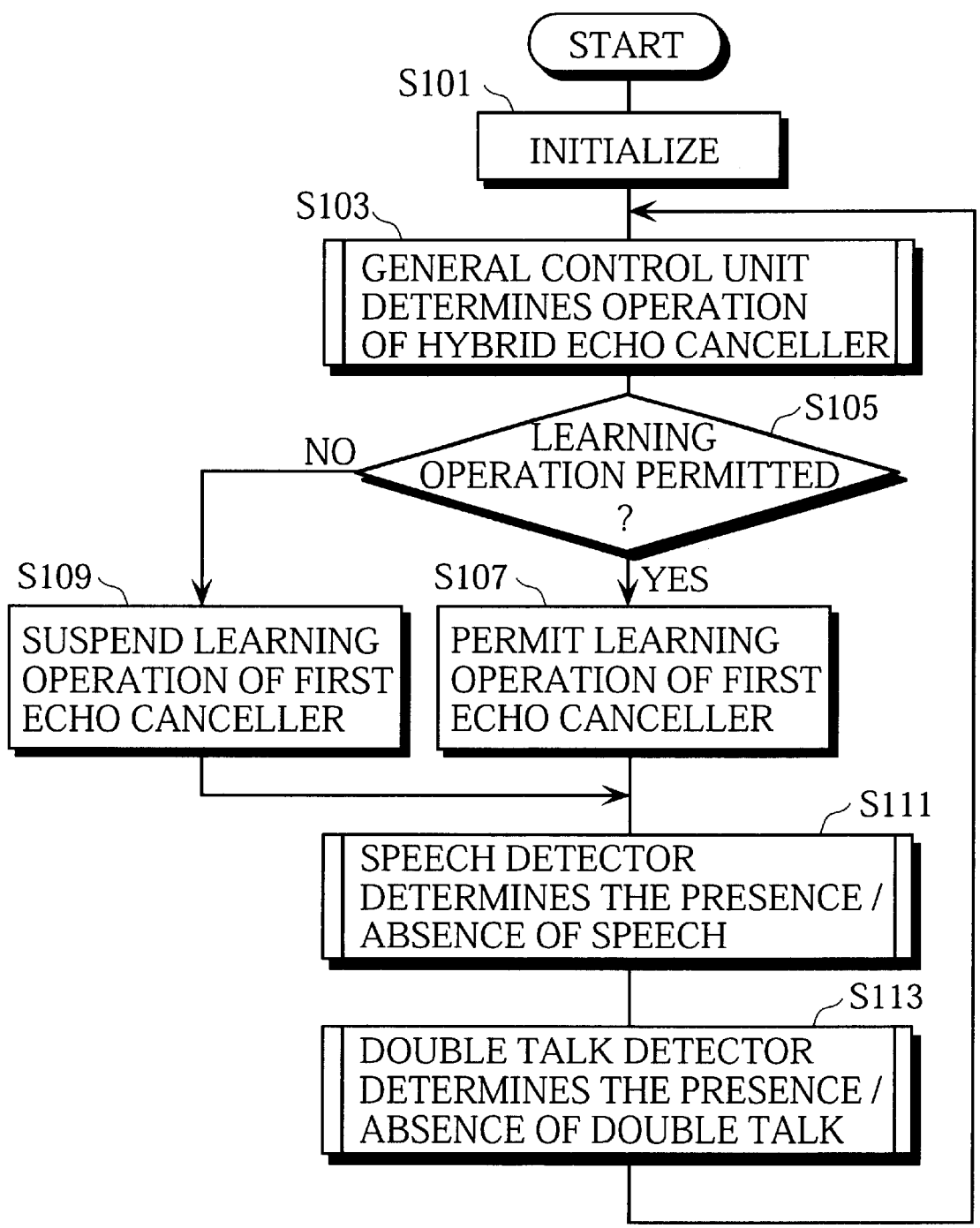
FIG. 10 is a flow chart illustrating a general procedure taken by the hybrid echo canceller shown in FIG. 8.

FIG. 10 illustrates a general procedure taken by the hybrid echo canceller 39 of the echo cancelling apparatus 10a.

Referring to FIG. 10, initializations are first performed on various flags such as "Double_flg", "Study_flg", "Speech_flg_1", "Speech_flg_2" and "Check_flg" as well as on various data such as "Send_lev", "Thl_1", "Thl_2", "in_lev", "Counter" and "Back_cnt" which are all stored in the RAM 16 (Step S101).

Subsequently, an operation of the hybrid echo canceller 39 is decided by the general control unit 66 (Step S103).

In Step S103, the operation of the switch 68 is controlled according to the flags "Double_flg" and "Check_flg". Specifically, under the single talk condition, the switch 68 selects the first hybrid echo canceller unit 40. In either of the cases of the double talk condition and the indeterminate condition or where the transmit signal level "Send_lev" is not sufficient for permitting the learning operation, the switch 68 selects the second hybrid echo canceller unit 42.

In the case of the double talk condition or where the transmit signal level "Send_lev" is not sufficient for permitting the learning operation, the adaptive filter coefficient held by the backup unit 62 is returned to the adaptive filter 54.

Subsequently, judgment is made as to whether the learning operation is permitted or not. If the learning operation is permitted, the flag "Study_flg" is set (Study_flg=1). If the learning operation is not permitted, the flag "Study_flg" is reset (Study_flg=0).

If the learning operation is permitted or Study_flg=1 (YES in Step S105), the first hybrid echo canceller unit 40 carries out the learning operation (Step S107). If the learning operation is not permitted or Study_flg=0 (NO in Step S105), the learning operation of the first hybrid echo canceller unit 40 is suspended (Step S109).

Subsequently, the speech detectors 72, 74 respectively check the speech signals sent through the receive path A and the transmit path B to determine whether the respective speech signals indicate the presence of speech or the absence of speech. According to the determinations, the flags "Speech_flg_1" and "Speech_flg_2" are set or reset, respectively (Step S111).

Specifically, if the speech signal sent through the receive path A indicates the presence of speech, the flag "Speech_flg_1" is set (Speech_flg_1=1). If, on the other hand, the speech signal indicates the absence of speech, the flag "Speech_flg_1" is reset (Speech_flg_1=0). If the speech signal sent through the transmit path B indicates the presence of speech, the flag "Speech_flg_2" is set (Speech_flg_2=1), whereas the flag "Speech_flg_2" is reset (Speech_flg_2=0) if the signal indicates the absence of speech.

Subsequently, the double talk detector 76 checks the flags "Speech_flg_1" and "Speech_flg_2" to determine whether the double talk condition is present or not. According to the determination, the flag "Double_flg" is either set or reset (Step S113). Then, the flow returns to Step S103.

The acoustic echo canceller 43 is controlled by the similar operations and therefore, the description thereof is omitted.

Figure 11:
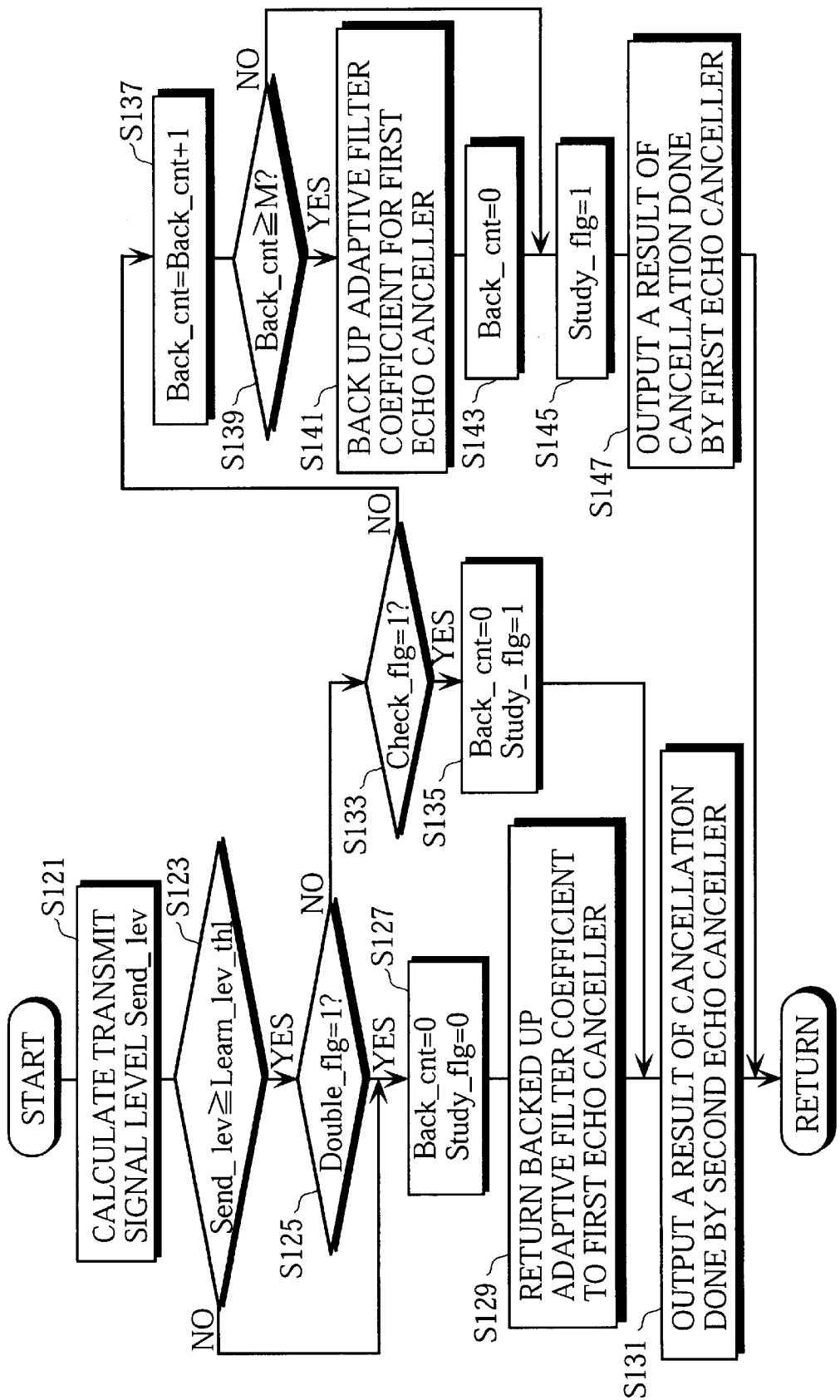
FIG. 11 is a flow chart illustrating a detailed procedure taken by Step S103 shown in FIG. 10.

FIG. 11 illustrates a procedure taken by Step S103 shown in FIG. 10.

First, the general control unit 66 calculates a transmit signal level "Send_lev" (Step S121). Then, judgment is made as to whether or not the transmit signal level "Send_lev" is not less than the threshold value "Learn_lev_thl" (Send_lev≧Learn_lev_thl) (Step S123).

If the transmit signal level "Send_lev" is not less than the threshold value "Learn_lev_thl" (Send_lev≧Learn_lev_thl), the transmit signal level "Send_lev" is determined to be sufficient for permitting the first hybrid echo canceller unit 40 to perform the learning operation. Then, judgment is made as to whether the flag "Double_flg" is set (Double_flg=1) or not (Step S125).

If the flag "Double_flg" is set (Double_flg=1), the double talk condition is determined to be present and then, the flow proceeds to Step S127. The flow also proceeds to Step S127 when the transmit signal level "Send_lev" is determined to be less than the threshold value "Learn_lev_thl" (Send_lev<Learn_lev_thl) in Step S123. That is, the flow proceeds to Step S127 when the learning operation of the first hybrid echo canceller unit 40 is inhibited.

In Step S127, the counter value "Back_cnt" used for the backup of the adaptive filter coefficient is reset (Back_cnt=0) while the flag "Study_flg" indicative of the learning condition is reset (Study_flg=0).

Subsequently, the adaptive filter coefficient backed up by the second hybrid echo canceller unit 42 is returned to the first hybrid echo canceller unit 40 (Step S129). Then, the switch is controlled for selection of an output from the second hybrid echo canceller unit 42 thereby to permit the second hybrid echo canceller unit 42 to output a cancellation result (Step S131).

In the case of the double talk condition or where the transmit signal level "Send_lev" does not reach the level to permit the learning operation of the first hybrid echo canceller unit 40, the learning operation thereof is suspended while the switch 68 is controlled for selection of the cancellation result of the second hybrid echo canceller unit 42.

If the flag "Double_flg" is reset (Double_flg=0) in the aforesaid Step S125, judgment is made as to whether the flag "Check_flg" indicative of the indeterminate condition is set (Check_flg=1) or not (Step S133).

If the flag "Check_flg" is set (Check_flg_1) or the indeterminate condition is present, the counter value "Back_cnt" used for the backup of the adaptive filter coefficient is reset (Back_cnt=0) while the flag "Study_flg" indicative of the learning condition is set (Study_flg=1) (Step S135). Subsequently, the flow proceeds to Step S131 in which the second hybrid echo canceller unit 42 outputs the cancellation result.

In the case of the indeterminate condition, the switch 68 selects the cancellation result outputted from the second hybrid echo canceller unit 42 but the first hybrid echo canceller unit 40 continues the learning operation.

If the flag "Check_flg" is reset (Check_flg=0) in the above Step S133, it is determined that the single talk condition is present and the counter value "Back_cnt" is incremented by 1 (Step S137) Subsequently, judgment is made as to whether the counter value "Back_cnt" is not less than M (Back_cnt≧M) or not (Step S139).

If the counter value "Back_cnt" is not less than M (Back_cnt≧M), the adaptive filter coefficient of the first hybrid echo canceller unit 40 is backed up by the second hybrid echo canceller unit 42 (Step S141) and thereafter, the counter value "Back_cnt" is reset (Back_cnt=0) (Step S143). Subsequently, the flow proceeds to Step S145.

If the counter value "Back_cnt" does not reach M in the aforesaid Step S139, the flow proceeds to Step S145.

In Step S145, the flag "Study_flg" is set (Study_flg=1). Then, the switch 68 is controlled for selection of the output from the first hybrid echo canceller unit 40 thereby to permit the first hybrid echo canceller unit 40 to output the cancellation result (Step S147).

Specifically, under the single talk condition, the first hybrid echo canceller unit 40 performs the learning operation. On the other hand, the switch 68 is controlled for selection of the cancellation result outputted from the first hybrid echo canceller unit 40. At regular time intervals after the single talk condition has appeared, the adaptive filter coefficient of the first hybrid echo canceller unit 40 is backed up by the second hybrid echo canceller unit 42.

The acoustic echo canceller 43 is controlled by the similar operations and therefore, the description thereof is omitted.

Figure 12:
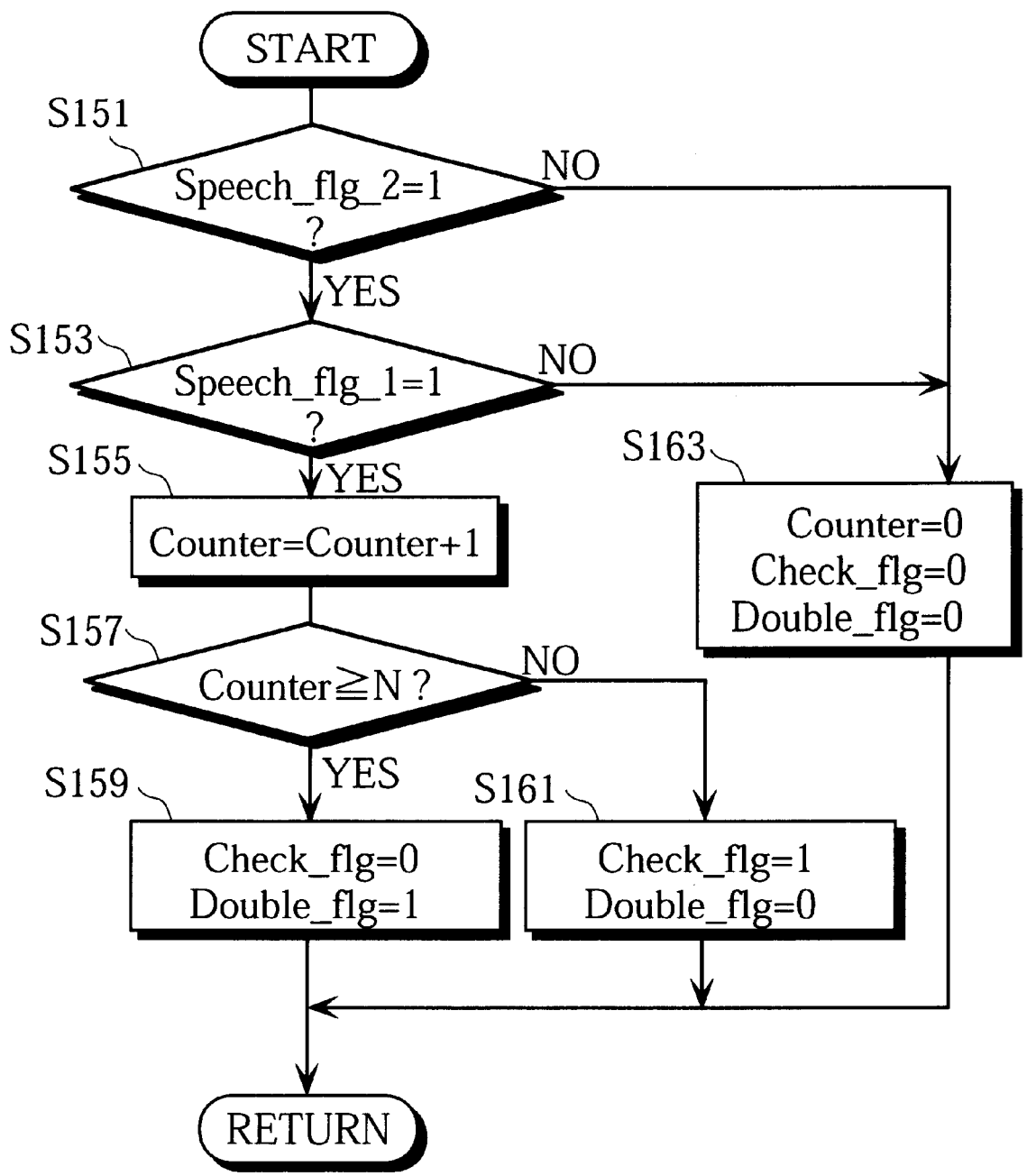
FIG. 12 is a flow chart illustrating a detailed procedure taken by Step S113 shown in FIG. 10.
Figure 13:
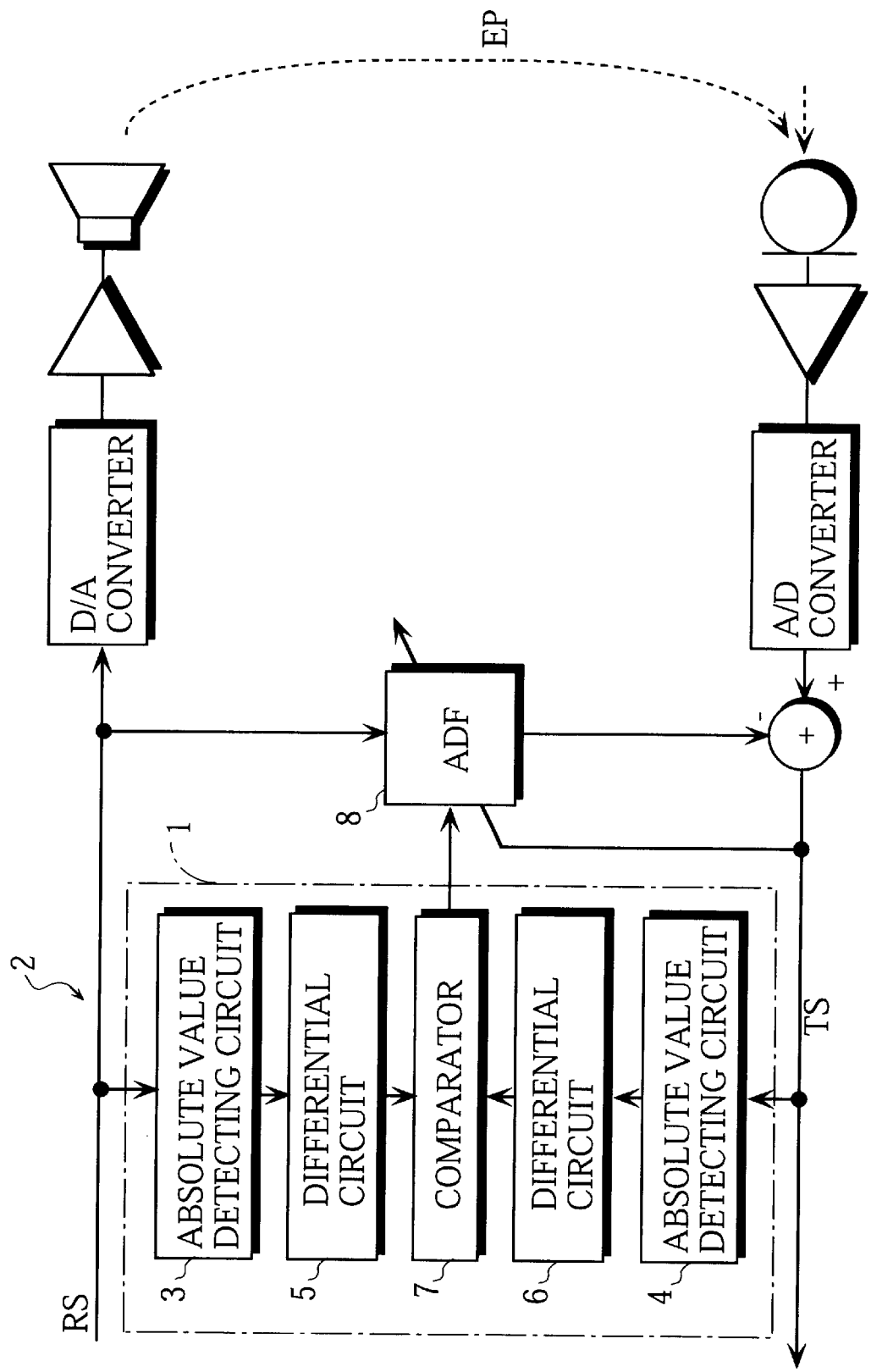
FIG. 13 is a block diagram showing an exemplary configuration of a prior-art echo canceller.

FIG. 12 illustrates a procedure taken by Step S113 shown in FIG. 10.

First, judgment is made as to whether the flag "Speech_flg_2" indicative of the speech detection result provided by the speech detector 74 is set (Speech_flg_2=1) or not (Step S151).

If the flag "Speech_flg_2" is set (Speech_flg_2=1) then judgment is made as to whether the flag "Speech_flg_1" indicative of the speech detection result provided by the speech detector 72 is set (Speech_flg_1=1) or not (Step S153).

If the flag "Speech_flg_1" is set (Speech_flg_1=1), the counter value "Counter" indicative of the duration of the indeterminate condition is incremented by 1 (Step S155) and thereafter, judgment is made as to whether "Counter" is not less than N (Counter≧N) or not (Step S157).

If "Counter" is not less than N (Counter≧N), it is determined that the double talk condition is present. Hence, the flag "Check_flg" is reset (Check_flg=0) while the flag "Double_flg" is set (Double_flg=1) (Step S159). The value of the indeterminate condition duration N is defined with the learning speed of the first hybrid echo canceller unit 40 taken into consideration.

If "Counter" does not reach N in Step S157, it is determined that the indeterminate condition is present, similarly to the first embodiment. Hence, the flag "Check_flg" is set (Check_flg=1) while the flag "Double_flg" is reset (Double_flg=0) (Step S161).

Where the flag "Speech_flg_2" is reset (Speech_flg_2=0) in the aforesaid Step S151 or where the flag "Speech_flg_1" is reset (Speech_flg_1=0) in the aforesaid Step S153, it is determined that the single talk condition rather than the double talk condition is present. Hence, the counter value "Counter" and the flags "Check_flg" and "Double_flg" are respectively reset (Counter=0, Check_flg=0, Double_flg=0) (Step S163). Incidentally, a procedure taken by Step S111 shown in FIG. 10 is the same as that taken by Step S11 shown in FIG. 3 (FIG. 5) and therefore, the description thereof is omitted.

It should be appreciated that the echo cancelling apparatus 10a according to the second embodiment provides a similar effect to that of the echo cancelling apparatus 10 according to the first embodiment. In addition, the echo cancelling apparatus 10a also offers the detection result as shown in FIG. 7, demonstrating its capability of detecting the double talk condition with high degrees of accuracy.

If the learning operation is continued in the presence of the double talk condition, the adaptive filter coefficient is corrupted to cause the occurrence of abnormal sound. However, the echo cancelling apparatus 10a is arranged such that the second hybrid echo canceller unit 42 and the second acoustic echo canceller unit 46 carry out the echo cancelling operations by using the backed up adaptive filter coefficients, respectively, when the double talk condition may be present. Accordingly, the echo cancelling apparatus 10a can eliminate such a trouble.

When configured as a half-duplex type echo canceller, the echo cancelling apparatus 10a also provides the double talk detection with high degrees of accuracy.

What is claimed is:

1. A method of respectively controlling an acoustic echo canceller for providing a first echo cancellation signal by subtracting a first echo replica signal from a transmit signal and a hybrid echo canceller for providing a second echo cancellation signal by subtracting a second echo replica signal from a receive signal, the method comprising the steps of:

a first step of determining whether a learning operation of said acoustic echo canceller is permitted or not based on a level of the second echo cancellation signal provided by said hybrid echo canceller;

a second step of determining whether a learning operation of said hybrid echo canceller is permitted or not based on a level of the first echo cancellation signal provided by said acoustic echo canceller;

a third step of performing a speech detection based on the level of said first echo cancellation signal;

a fourth step of performing a speech detection based on the level of said second echo cancellation signal;

a fifth step of detecting a double talk condition based on a result of the speech detection performed by said third step and a result of the speech detection performed by said fourth step;

a sixth step of controlling the learning operation of said acoustic echo canceller based on a determination made by said first step and a result of the double talk detection performed by said fifth step; and a seventh step of controlling the learning operation of said hybrid echo canceller based on a determination made by said second step and the result of the double talk detection performed by said fifth step.

2. A method of controlling the echo cancellers as set forth in claim 1, wherein said fifth step comprises:

a step of determining that a single talk condition is present if at least one of the results of the speech detections performed by said third step and said fourth step indicates the absence of speech;

a step of calculating a duration of speeches if both results of the speech detections performed by said third step and said fourth step indicate the presence of the speeches;

a step of determining that an indeterminate condition is present if said duration of the speeches is less than a predetermined period of time; and a step of determining that the double talk condition is present if said duration of the speeches is not less than the predetermined period of time.

3. A method of controlling the echo cancellers as set forth in claim 2, further comprising:

a step of backing up an adaptive filter coefficient provided by the learning operation of said acoustic echo canceller and an adaptive filter coefficient provided by the learning operation of said hybrid echo canceller, respectively, when the single talk condition is present; and a step of performing echo cancellation operations by using the adaptive filter coefficients backed up by said acoustic echo canceller and said hybrid echo canceller, respectively, when the double talk condition or the indeterminate condition is present.

4. An echo canceller control device for respectively controlling an acoustic echo canceller for providing a first echo cancellation signal by subtracting a first echo replica signal from a transmit signal and a hybrid echo canceller for providing a second echo cancellation signal by subtracting a second echo replica signal from a receive signal, the control device comprising:

first judgment means for determining whether a learning operation of said acoustic echo canceller is permitted or not based on a level of the second echo cancellation signal provided by said hybrid echo canceller;

second judgment means for determining whether a learning operation of said hybrid echo canceller is permitted or not based on a level of the first echo cancellation signal provided by said acoustic echo canceller;

first speech detecting means for performing a speech detection based on the level of said first echo cancellation signal;

second speech detecting means for performing a speech detection based on the level of said second echo cancellation signal;

double talk detecting means for detecting a double talk condition based on a result of the speech detection performed by said first speech detecting means and a result of the speech detection performed by said second speech detecting means;

first control means for controlling the learning operation of said acoustic echo canceller based on a determination made by said first judgment means and a result of the double talk detection performed by said double talk detecting means; and second control means for controlling the learning operation of said hybrid echo canceller based on a determination made by said second judgment means and the result of the double talk detection performed by said double talk detecting means.

* * * * *